United States Patent
LaFauci et al.

(10) Patent No.: US 6,684,277 B2
(45) Date of Patent: Jan. 27, 2004

(54) BUS TRANSACTION VERIFICATION METHOD

(75) Inventors: Peter Dean LaFauci, Holly Springs, NC (US); Bryan Heath Stypmann, Charlotte, NC (US); Paul David Bryan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 09/770,584

(22) Filed: Jan. 26, 2001

(65) Prior Publication Data

US 2002/0103950 A1 Aug. 1, 2002

(Under 37 CFR 1.47)

(51) Int. Cl.$^7$ .................. G06F 13/00; G06F 17/50
(52) U.S. Cl. .................. 710/100; 702/118; 703/14; 703/24
(58) Field of Search .................. 710/100, 65, 305, 710/306; 703/14, 15, 24, 25; 714/33, 37, 43; 702/118

(56) References Cited

U.S. PATENT DOCUMENTS

| | | |
|---|---|---|
| 4,715,035 A | 12/1987 | Boehner |
| 5,455,928 A | 10/1995 | Herlitz |
| 5,663,900 A | 9/1997 | Bhandari et al. |
| 5,768,567 A | 6/1998 | Klein et al. |
| 5,930,482 A | 7/1999 | Carter et al. |
| 5,946,474 A | 8/1999 | Skogby |
| 5,963,722 A | 10/1999 | Carter |
| 5,996,034 A | 11/1999 | Carter |
| 6,016,554 A | 1/2000 | Skrovan et al. |
| 6,018,807 A | 1/2000 | Larson |
| 6,073,194 A * | 6/2000 | Lowe .................. 710/100 |
| 6,496,792 B1 * | 12/2002 | Magnusson .................. 703/27 |
| 6,507,808 B1 * | 1/2003 | LaFauci .................. 703/20 |

OTHER PUBLICATIONS

Proceedings of the 39$^{th}$ Midwest Symposium on Circuits and Systems, Aug. 18–21, 1996, Iowa State University, Ames, Iowa.
1996 IEEE International Verilog HDL Conference, Feb. 26–28, 1996, Santa Clara, CA, IEEE Computer Society Press, Los Alamitos, California.
Conference Record of the 1991 IEEE Nuclear Science Symposium and Medical Imaging Conference, Nov. 2–9, 1991, Santa Fe, New Mexico USA.

* cited by examiner

*Primary Examiner*—Glenn A. Auve
(74) *Attorney, Agent, or Firm*—Winstead, Sechrest & Minick

(57) ABSTRACT

The present invention provides a method and computer readable medium with program instructions for automatically verifying bus transactions. The method includes: parsing a parameter code for the bus transactions, wherein the parameter code comprises a plurality of expected parameter values for the bus transactions; automatically integrating the parsed parameter code into a checking program; and automatically executing the checking program, wherein the checking program compares the plurality of expected parameter values with a plurality of actual parameter values for the bus transactions. The bus transaction verification method in accordance with the present invention automates the coding of expected parameter values for each test case into a checking program and automates the execution of the checking program, where the checking program compares the expected parameter values with the actual parameter values. By automating the bus transaction verification in this manner, the process is more efficient and reduces the chances of human error and inaccurate observation.

8 Claims, 5 Drawing Sheets

BUS TRANSACTION VERIFICATION METHOD

FIELD OF THE INVENTION

The present invention relates to bus architectures, and more particularly to the verification of bus transactions for bus architectures.

BACKGROUND OF THE INVENTION

System-On-Silicon, Application Specific Integrated Circuit (ASIC), and other hardware which utilize standardized buses typically involve the simulation of logic designs which use bus transactions as defined by the bus architecture specifications. Bus models and other forms of test case stimulus are commonly used for bus transaction verification to ensure that the logic designs perform properly and are compliant with the bus architecture specifications.

In the process of bus transaction verification, each test case has a number of expected parameter values based on the bus architecture. These expected parameter values are compared with actual parameter values obtained from the bus verification process to verify the functioning of the logical components of the design. Conventionally, this bus transaction verification is performed either by hand-coding the expected parameter values into checking programs that check the actual signals on a per test case basis, or by visual inspection of the waveforms. The code and/or check parameter values and bus behavior are manually coded against the test case and architectural specification. This process is repeated for each test case. Thus, because manual coding is required, this process is cumbersome and time consuming. Also, there is significant chances of human error and inaccurate observation.

Accordingly, there is a need for an improved bus transaction verification method. The improved method should automate the coding of the check parameter values and the bus behavior against the test case and architectural specification. The present invention addresses such a need.

SUMMARY OF THE INVENTION

The present invention provides a method and computer readable medium with program instructions for automatically verifying bus transactions. The method includes: parsing a parameter code for the bus transactions, wherein the parameter code comprises a plurality of expected parameter values for the bus transactions; automatically integrating the parsed parameter code into a checking program; and automatically executing the checking program, wherein the checking program compares the plurality of expected parameter values with a plurality of actual parameter values for the bus transactions. The bus transaction verification method in accordance with the present invention automates the coding of expected parameter values for each test case into a checking program and automates the execution of the checking program, where the checking program compares the expected parameter values with the actual parameter values. By automating the bus transaction verification in this manner, the process is more efficient and reduces the chances of human error and inaccurate observation.

DETAILED DESCRIPTION

The present invention provides an improved bus transaction verification method. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The bus transaction verification method in accordance with the present invention automates the coding of expected parameter values for each test case into a checking program and automates the execution of the checking program, where the checking program compares the expected parameter values with the actual parameter values. By automating the bus transaction verification in this manner, the process is more efficient and reduces the chances of human error and inaccurate observation.

To more particularly describe the features of the present invention, please refer to FIGS. 1 through 4 in conjunction with the discussion below.

Figure 1:
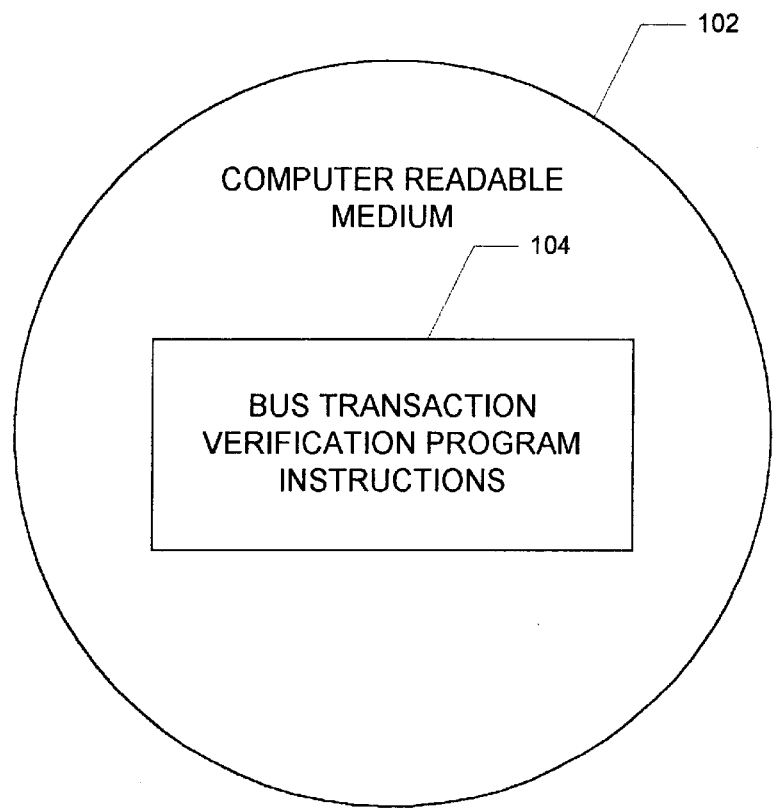
FIG. 1 illustrates a computer readable medium with program instructions for the bus transaction verification method in accordance with the present invention.

FIG. 1 illustrates a computer readable medium with program instructions for the bus transaction verification method in accordance with the present invention. The computer readable medium 102 can be a magnetic disk, magnetic tape, optical media, or any other type of media readable by a computer. The computer readable medium 102 comprises program instructions 104 which, when executed, implements the bus transaction verification method in accordance with the present invention.

Figure 2:
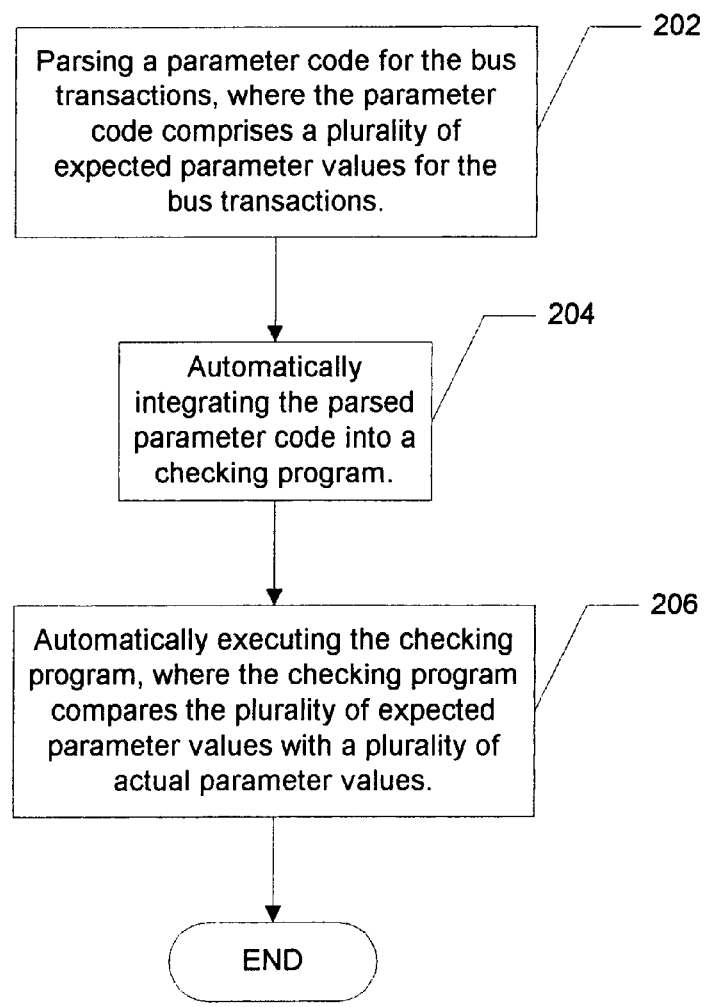
FIG. 2 is a flow chart illustrating a preferred embodiment of the bus transaction verification method in accordance with the present invention.

FIG. 2 is a flow chart illustrating a preferred embodiment of the bus transaction verification method in accordance with the present invention. First, a parameter code for the bus transactions is parsed, wherein the parameter code comprises a plurality of expected parameter values for the bus transactions, via step 202. In the preferred embodiment, the parameter code is written in Bus Functional Language (BFL). The parameter values of the parameter code define attributes for specified bus signals and configurations of each test case. In the preferred embodiment, the parameter code in BFL format is parsed to the Hardware Description Language (HDL) format, but other formats may be used without departing from the spirit and scope of the present invention. Next, the parsed parameter code is automatically integrated into a checking program, via step 204. Then, the checking program is automatically executed, wherein the checking program compares the plurality of expected parameter values with a plurality of actual parameter values, via step 206. In the preferred embodiment, steps 202, 204, and 206 are performed via an executable script that completes these tasks in the order as described. These steps 202, 204, and 206 are repeated for each test case. The results are documented in an execution log. This executable script is fully automated, requiring no intermediate intervention by the user after the start of the execution. In this manner, the bus transaction verification process is automated, increasing efficiency and reducing the chances of human error and inaccurate observation.

Figure 3:
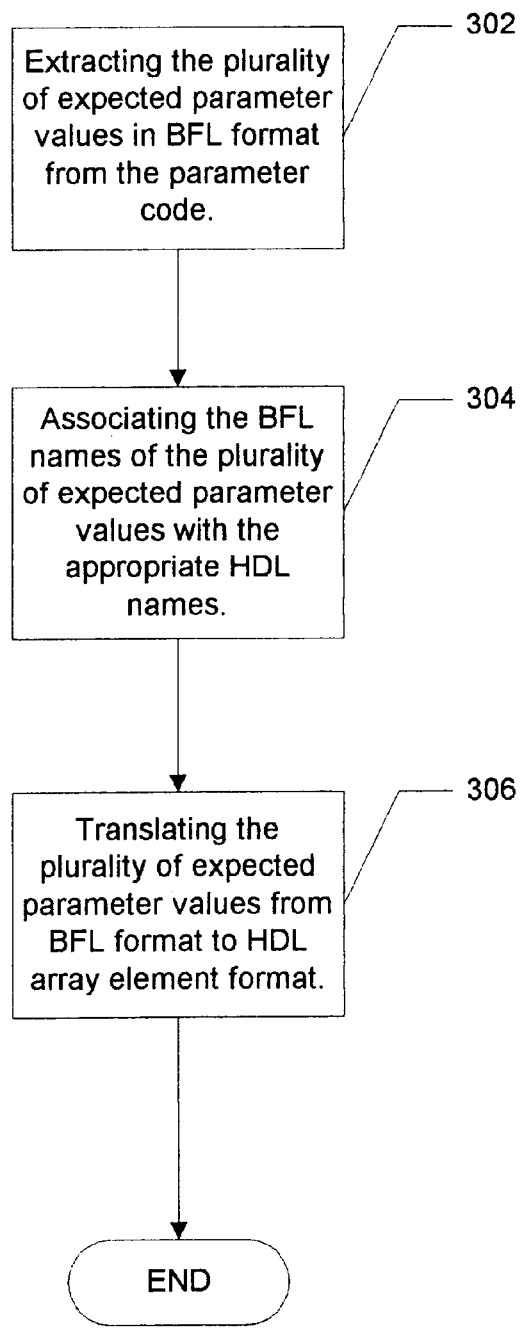
FIG. 3 is a flow chart illustrating in more detail the parsing step of the bus transaction verification method in accordance with the present invention.

FIG. 3 is a flow chart illustrating in more detail the parsing step 202 of the bus transaction verification method in accordance with the present invention. First, the plurality of expected parameter values in BFL format is extracted from the parameter code, via step 302. Next, the BFL names of the plurality of expected parameter values are associated with the appropriate HDL names, via step 304. Then, the plurality of expected parameter values are translated from the BFL format to the HDL array element format, via step 306. The translation includes syntactical translation from the BFL format to the HDL array element format.

Figure 4:
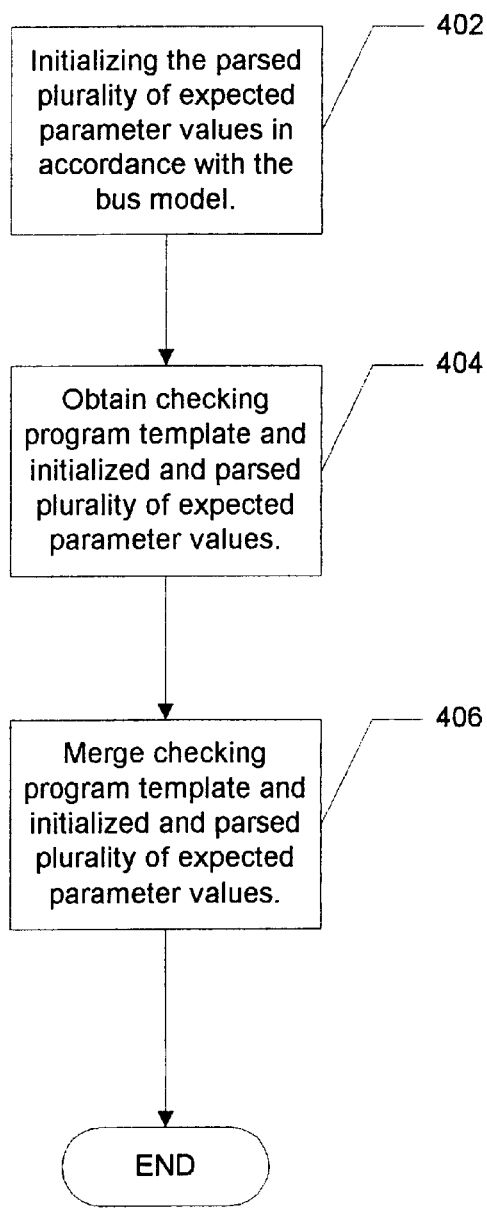
FIG. 4 is a flow chart illustrating in more detail the automatically integrating step of the bus transaction verification method in accordance with the present invention.

FIG. 4 is a flow chart illustrating in more detail the automatically integrating step 204 of the bus transaction verification method in accordance with the present invention. First, the parsed plurality of expected parameter values are initialized in accordance with the bus model, via step 402. The initialization links the plurality of expected parameter values to the bus model and generates any HDL components necessary for the simulation. In the preferred embodiment, the initialization is achieved through a single command line statement that calls an initialization executable which manipulates each respective test case and outputs a HDL command file representative of the given BFL test case. After integration, the checking program template and the initialized and parsed plurality of expected parameter values are obtained, via step 404. Then, the checking program template and the initialized and parsed plurality of expected parameter values are merged, via step 406. In the merging, the initialized and parsed plurality of expected parameter values are inserted into the checking program template at the appropriate locations. Once merged, the checking program is ready for execution.

Figure 5:
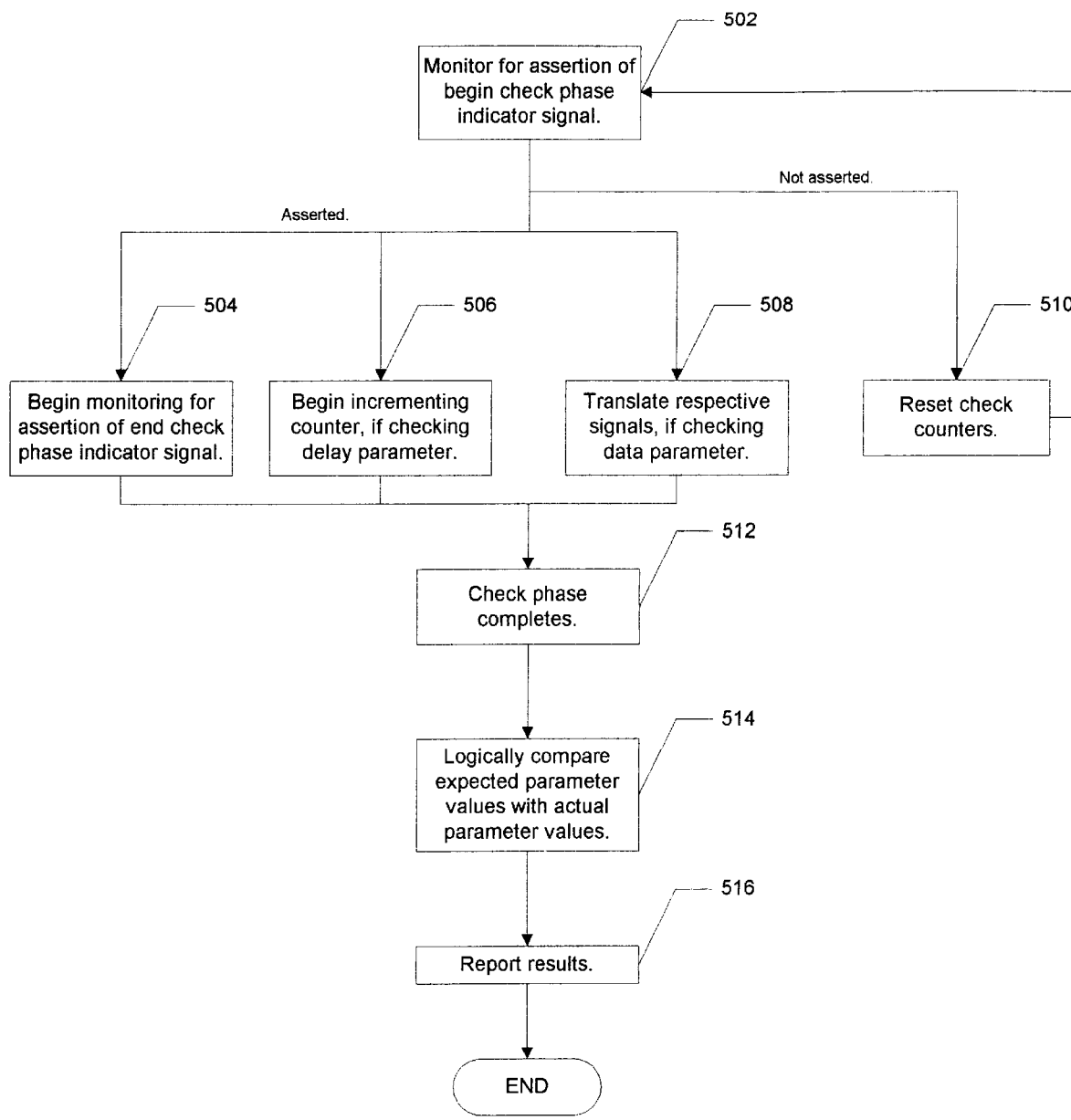
FIG. 5 is a flow chart illustrating in more detail the executing step in the bus transaction verification method in accordance with the present invention.

FIG. 5 is a flow chart illustrating in more detail the executing step 206 in the bus transaction verification method in accordance with the present invention. Once merged, the checking program begins to monitor for the assertion of a begin check phase indicator signal, via step 502. The begin check phase indicator signal indicates the beginning of a check phase window, within which the checking for an individual signal is to occur. There are two types of checks. One type of check is for a signal delay parameter, where there is an associated delay for the signal. For the delay check, the expected signal delay is compared to the actual signal delay. Another type of check is for information or data. For the data check, the expected data is compared with the actual data. If the check is a delay check, then the begin check phase indicator signal also indicates the delay associated with the signal. While a begin check phase indicator signal is not asserted, the check counters are continuously reset, via step 510. The check counters will measure the actual delay once the checking begins. When the begin check phase indicator signal is asserted, steps 504, 506, and 508 are performed in parallel. The checking program begins to monitor for the assertion of the end check phase indicator signal, via step 504. The end check phase indicator signal indicates the end of the check phase window, at which time the checking is stopped. At approximately the same time, if the check is a delay check, then the checking program begins incrementing the check counter, via step 506. If the check is a data check, then the respective signals are translated, via step 508, into the actual data. Examples of such translation includes actual bit slicing or bit extraction. Bit slicing and bit extraction are well known in the art and will not be further described here.

When an end check phase indicator signal is asserted, the check phase completes, via step 512. The checking program then logically compares the expected parameter value with the actual parameter values, via step 514. The results of this comparison are reported, via step 516. The report could be a log file or real-time reporting onto a screen.

An improved bus transaction verification method has been disclosed. The bus transaction verification method in accordance with the present invention automates the coding of expected parameter values for each test case into a checking program and automates the execution of the checking program, where the checking program compares the expected parameter values with the actual parameter values. By automating the bus transaction verification in this manner, the process is more efficient and reduces the chances of human error and inaccurate observation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for automatically verifying bus transactions, comprising the steps of:
    (a) parsing a parameter code for the bus transactions, wherein the parameter code comprises a plurality of expected parameter values for the bus transactions, wherein the parsing step (a) comprises:
        (a1) extracting the plurality of expected parameter values in a Bus Functional Language (BFL) format from the parameter code,
        (a2) associating BFL names of the plurality of expected parameter values with appropriate Hardware Description Language (HDL) names, and
        (a3) translating the plurality of expected parameter values from the BFL format to a HDL array element format;
    (b) automatically integrating the parsed parameter code into a checking program; and
    (c) automatically executing the checking program, wherein the checking program compares the plurality of expected parameter values with a plurality of actual parameter values for the bus transaction.

2. A method for automatically verifying bus transactions, comprising the steps of:
    (a) parsing a parameter code for the bus transactions, wherein the parameter code comprises a plurality of expected parameter values for the bus transactions;
    (b) automatically integrating the parsed parameter code into a checking program, wherein the automatically integrating step comprises:
        (b1) initializing the parsed plurality of expected parameter values in accordance with a bus model,
        (b2) obtaining a checking program template and the initialized and parsed plurality of expected parameter values, and
        (b3) merging the checking program template and the initialized and parsed plurality of expected parameter values; and (c) automatically executing the checking program, wherein the checking program compares the plurality of expected parameter values with a plurality of actual parameter values for the bus transaction.

3. A method for automatically verifying bus transactions, comprising the steps of:
- (a) parsing a parameter code for the bus transactions, wherein the parameter code comprises a plurality of expected parameter values for the bus transactions;
- (b) automatically integrating the parsed parameter code into a checking program; and
- (c) automatically executing the checking program, wherein the checking program compares the plurality of expected parameter values with a plurality of actual parameter values for the bus transaction, wherein the automatically executing step (c) comprises:
  - (c1) monitoring for an assertion of a begin check phase indicator signal,
  - (c2) performing a check if the begin check phase indicator signal is asserted, wherein the performing step (c2) comprises:
    - (c2i) determining that the begin check phase indicator signal has been asserted,
    - (c2ii) incrementing a check counter until an end check phase indicator signal has been asserted, if a check is a delay check, and
    - (c2iii) translating a signal into actual data, if the check is a data check, and
  - (c3) comparing the plurality of expected parameter values with the plurality of actual parameter values for the bus transaction.

4. A method for automatically verifying bus transactions, comprising the steps of:
- (a) parsing a parameter code for the bus transactions, wherein the parameter code comprises a plurality of expected parameter values for the bus transactions;
- (b) automatically integrating the parsed parameter code into a checking program; and
- (c) automatically executing the checking program, wherein the checking program compares the plurality of expected parameter values with a plurality of actual parameter values for the bus transaction, wherein the automatically executing step (c) comprises:
  - (c1) monitoring for an assertion of a begin check phase indicator signal,
  - (c2) performing a check if the begin check phase indicator signal is asserted, and
  - (c3) comparing the plurality of expected parameter values with the plurality of actual parameter values for the bus transaction, wherein the comparing step (c3) comprises:
    - (c3i) logically comparing a check counter and an expected delay parameter, if the check is a delay check, and
    - (c3ii) logically comparing an actual data with an expected data parameter, if the check is a data check.

5. A computer readable medium with program instructions for automatically verifying bus transactions, the instructions for:
- (a) parsing a parameter code for the bus transactions, wherein the parameter code comprises a plurality of expected parameter values for the bus transactions, wherein the parsing instructions (a) comprises the instructions for:
  - (a1) extracting the plurality of expected parameter values in a Bus Functional Language (BFL) format from the parameter code,
  - (a2) associating BFL names of the plurality of expected parameter values with appropriate Hardware Description Language (HDL) names, and
  - (a3) translating the plurality of expected parameter values from the BFL format to a HDL array element format;
- (b) automatically integrating the parsed parameter code into a checking program; and
- (c) automatically executing the checking program, wherein the checking program compares the plurality of expected parameter values with a plurality of actual parameter values for the bus transaction.

6. A computer readable medium with program instructions for automatically verifying bus transactions, the instructions for:
- (a) parsing a parameter code for the bus transactions, wherein the parameter code comprises a plurality of expected parameter values for the bus transactions;
- (b) automatically integrating the parsed parameter code into a checking program, wherein the automatically integrating instructions comprises the instructions for:
  - (b1) initializing the parsed plurality of expected parameter values in accordance with a bus model,
  - (b2) obtaining a checking program template and the initialized and parsed plurality of expected parameter values, and
  - (b3) merging the checking program template and the initialized and parsed plurality of expected parameter values; and
- (c) automatically executing the checking program, wherein the checking program compares the plurality of expected parameter values with a plurality of actual parameter values for the bus transaction.

7. A computer readable medium with program instructions for automatically verifying bus transactions, the instructions for:
- (a) parsing a parameter code for the bus transactions, wherein the parameter code comprises a plurality of expected parameter values for the bus transactions;
- (b) automatically integrating the parsed parameter code into a checking program; and
- (c) automatically executing the checking program, wherein the checking program compares the plurality of expected parameter values with a plurality of actual parameter values for the bus transaction, wherein the automatically executing instructions (c) comprises the instructions for:
  - (c1) monitoring for an assertion of a begin check phase indicator signal,
  - (c2) performing a check if the begin check phase indicator signal is asserted, wherein the performing instructions (c2) comprises the instructions for:
    - (c2i) determining that the begin check phase indicator signal has been asserted,
    - (c2ii) incrementing a check counter until an end check phase indicator signal has been asserted, if a check is a delay check, and
    - (c2iii) translating a signal into actual data, if the check is a data check, and
  - (c3) comparing the plurality of expected parameter values with the plurality of actual parameter values for the bus transaction.

8. A computer readable medium with program instructions for automatically verifying bus transactions, the instructions for:
- (a) parsing a parameter code for the bus transactions, wherein the parameter code comprises a plurality of expected parameter values for the bus transactions;

(b) automatically integrating the parsed parameter code into a checking program; and
(c) automatically executing the checking program, wherein the checking program compares the plurality of expected parameter values with a plurality of actual parameter values for the bus transaction, wherein the automatically executing instructions (c) comprises the instructions for:
  (c1) monitoring for an assertion of a begin check phase indicator signal,
  (c2) performing a check if the begin check phase indicator signal is asserted, and
  (c3) comparing the plurality of expected parameter values with the plurality of actual parameter values for the bus transaction, wherein the comparing instructions (c3) comprises the instructions for:
    (c3i) logically comparing a check counter and an expected delay parameter, if the check is a delay check, and
    (c3ii) logically comparing an actual data with an expected data parameter, if the check is a data check.

* * * * *